US008213302B2

(12) United States Patent
Wang et al.

(10) Patent No.: US 8,213,302 B2
(45) Date of Patent: Jul. 3, 2012

(54) MANAGEMENT OF A WIRELESS NETWORK

(75) Inventors: Zhou Wang, Aachen (DE); Alain Gefflaut, Aachen (DE); Andreas Steinmetzler, Aachen (DE)

(73) Assignee: Microsoft Corporation, Redmond, WA (US)

( * ) Notice: Subject to any disclaimer, the term of this patent is extended or adjusted under 35 U.S.C. 154(b) by 228 days.

(21) Appl. No.: 12/023,527

(22) Filed: Jan. 31, 2008

(65) Prior Publication Data

US 2009/0196173 A1   Aug. 6, 2009

(51) Int. Cl.
*H04J 3/16* (2006.01)
(52) U.S. Cl. ......... 370/229; 370/252; 370/331; 370/437
(58) Field of Classification Search ............. 370/229, 370/230, 235, 252, 254, 310, 331, 332, 333, 370/431, 437, 465; 455/436, 437, 450, 451, 455/452.1, 452.2
See application file for complete search history.

(56) References Cited

U.S. PATENT DOCUMENTS

| 5,287,544 | A | * | 2/1994 | Menich et al. | ................. | 455/450 |
| 5,507,008 | A | * | 4/1996 | Kanai et al. | .................... | 455/512 |
| 6,009,332 | A | | 12/1999 | Haartsen | | |
| 6,052,594 | A | * | 4/2000 | Chuang et al. | ................. | 455/450 |
| 6,771,964 | B1 | * | 8/2004 | Einola et al. | ................... | 455/437 |
| 7,027,418 | B2 | * | 4/2006 | Gan et al. | ....................... | 370/329 |
| 2007/0195756 | A1 | * | 8/2007 | Komiya et al. | ............... | 370/362 |
| 2008/0069065 | A1 | * | 3/2008 | Wu et al. | ........................ | 370/340 |

FOREIGN PATENT DOCUMENTS

WO   WO0060896 A1   10/2000
WO   WO0260211 A2   8/2002

OTHER PUBLICATIONS

Durand, et al., "Channel Selection", in IEEE 802.11-05/1066r0, Nov. 3, 2005, pp. 3-6, retrieved from the internet at <<hhttps://mentor.ieee.org/802.11/dcn/05/11-05-1066-00-000v-1066r0>>.*
Durand, et al., "Channel Selection", in IEEE 802.11-05/1066r0, Nov. 3, 2005, pp. 3-6, retrieved from the internet at <<https://mentor.ieee.org/802.11/dcn/05/11-05-1066-00-000v-1066r0>>.
PCT International Search Report for corresponding PCT Application No. PCT/US2008/088138 filed Dec. 23, 2008, 3 pages.

* cited by examiner

*Primary Examiner* — Kevin C Harper
*Assistant Examiner* — Mon Cheri Davenport
(74) *Attorney, Agent, or Firm* — Lee & Hayes, PLLC (57) ABSTRACT

The disclosure describes a system for active channel management in a wireless network. The system may include spectrum monitoring in order to determine channel usage within a wireless network and/or to provide a projected transmission quality for each available channel. Another aspect of the system concerns allowing nodes in a wireless network to exchange spectrum usage data. The system may include renegotiation and handover of data transmission between channels and/or different wireless technologies.

16 Claims, 4 Drawing Sheets

MANAGEMENT OF A WIRELESS NETWORK

BACKGROUND

The term 'wireless network' commonly refers to telecommunications networks which comprise 'nodes' (i.e. devices which transmit and receive information) connected by a wireless remote information transmission system that uses electromagnetic waves, most commonly radio waves, for the carrier.

Various specifications have been developed for 'over-the-air' interfaces between nodes, of which the 802.11 family, developed by the Institute of Electrical and Electronic Engineers (IEEE), is perhaps the best known.

Wireless networks often suffer from inefficient carrier waves usage and have a limited ability to withstand interference. Often, wireless networks use only a fraction of the assigned spectrum for data exchange. For example, in 802.11b and 802.11g, three non-overlapping channels (in 802.11a, thirteen non-overlapping channels) are available in the assigned spectrum, but only one channel is usually used for data transmissions because the channel is fixed in a given network. The channel and other transmission parameters may be fixed by an access point or may be statically configured by users. As used herein, the term 'channel' refers to a portion of the spectrum characterized by a central frequency and a band width. In some networks, nodes may communicate directly with one another rather than via an access point but such networks are also statically configured (i.e. the transmission channel and other transmission parameters are fixed during network setup). Multiple communicating nodes contend with each other on the same channel while other channels are under utilized.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The disclosure describes a system for active channel management in a wireless network. The system may include spectrum monitoring in order to determine channel usage within a wireless network and/or to provide a projected transmission quality for each available channel. Another aspect of the system concerns allowing nodes in a wireless network to exchange spectrum usage data. The system may include renegotiation and handover of data transmission between channels and/or different wireless technologies.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present example and is not intended to represent the only forms in which the present example may be constructed or utilized. The description sets forth the functions of the example and the sequence of steps for constructing and operating the example. However, the same or equivalent functions and sequences may be accomplished by different examples.

In this disclosure, reference is made to the layers of the OSI model. As will be familiar to the skilled person, Open System Interconnection (OSI) is an ISO standard for worldwide communications which defines a networking framework for implementing data transmission protocols in seven layers. Control is passed from one layer to the next, starting at the application layer in the transmitting node, proceeding to the bottom layer, then data is transmitted over the network to the receiving node and control is passed back up the layers. Although this seven layer model is well understood by the skilled person, it is now briefly discussed for convenience.

The Application Layer (Layer 7) supports applications and end-user processes. The communicating nodes are identified and quality of service, user authentication and privacy are considered. The Presentation Layer (Layer 6) translates from application to network format, and vice versa, transforming data into the form that the application layer can accept or formatting data to be sent across a network. The Session Layer (Layer 5) sets up, coordinates, and terminates exchanges between the applications at each communicating node. The Transport Layer (Layer 4) provides transfer of data between end nodes, and is responsible for error recovery and flow control.

The Network Layer (Layer 3) provides switching and routing technologies to create virtual circuits for transmitting data from node to node. It handles routing, forwarding, addressing, internetworking, error handling, congestion control and packet sequencing.

At the Data Link layer (Layer 2), data packets are encoded and decoded into bits according to the specific transmission protocol in use. The data link layer is divided into two sublayers: The Media Access Control (MAC) layer and the Logical Link Control (LLC) layer. The MAC sublayer controls how a node on the network gains access to the data and permission to transmit it. The LLC layer controls frame synchronization, flow control and error checking.

The Physical layer (Layer 1) conveys the bit stream, e.g. in an electrical impulse, light or radio signal, through the network at the electrical and mechanical level. Hardware such as nodes, as well as cables and network interface cards are part of this layer.

Although the present examples are described and illustrated herein as being implemented in a domestic environment, the system described is provided as an example and not a limitation. As those skilled in the art will appreciate, the present examples are suitable for application in a variety of different environments.

Figure 1:
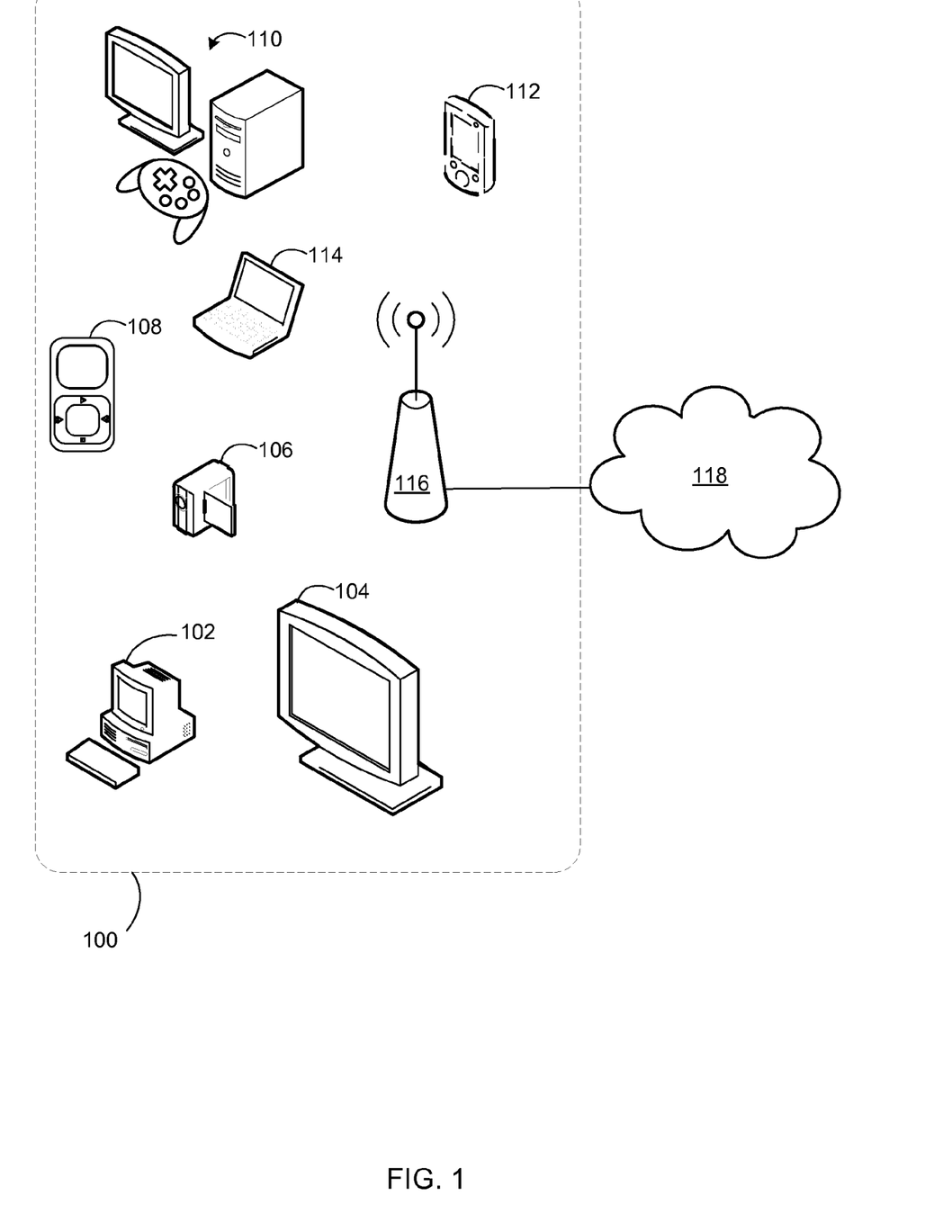
FIG. 1 schematically shows a wireless network.

FIG. 1 schematically shows a wireless network 100 in a domestic environment. The network 100 comprises a number of nodes, specifically a desk top computer 102, a television 104, a digital camera 106, an MP3 music player 108, a games computer 110, a Personal Digital Assistant (PDA) 112 and a laptop computer 114. All of these nodes are in wireless communication with an access point 116. The access point 116 is connected by a wired connection to the Internet 118.

Under current, known, practice, the nodes 102-114 will transmit and receive data on a single wireless channel, determined by the access point 116. Communicating nodes cannot dynamically negotiate transmission parameters to achieve better throughput, nor can they react to interference on the channel caused by other nodes during transmission. As will be understood by the skilled person, transmission parameters include (but are not limited to): the transmission standard (technology used such as 802.11b or 802.11a), the RF channel (i.e. the frequency range for transmission), the transmission bit rate, the modulation method, and the transmission power. The nodes 102-114 must contend with each other on the same channel while other channels are underutilized.

In the example network 100 (which comprises wireless nodes), all data traffic from a transmitting node is sent to the access point 116 and then from the access point 116 to a receiving node using the same wireless channel. This results in consuming wireless capacity twice over. High data rate network traffic, for example streaming high definition video, is capable of occupying the entire bandwidth of the chosen channel. Any additional transmission of data between nodes in the network or interference on that channel created by other types of devices will degrade the user experience, for example causing the video to freeze or break up or otherwise slowing the download/data exchange rate. Using a single channel with static configuration of the radio transmission parameters limits the way the available spectrum is used and thus limits the achievable throughput and the ability of the network 100 to deal with interference and contention. Other known networks allow ad-hoc connection, i.e. allow nodes to communicate directly rather than via an access point 116. In such networks, the channel to be used is manually configured by users during connection setup without knowledge or experience of the operating radio environment and cannot be changed during connection.

Figure 2:
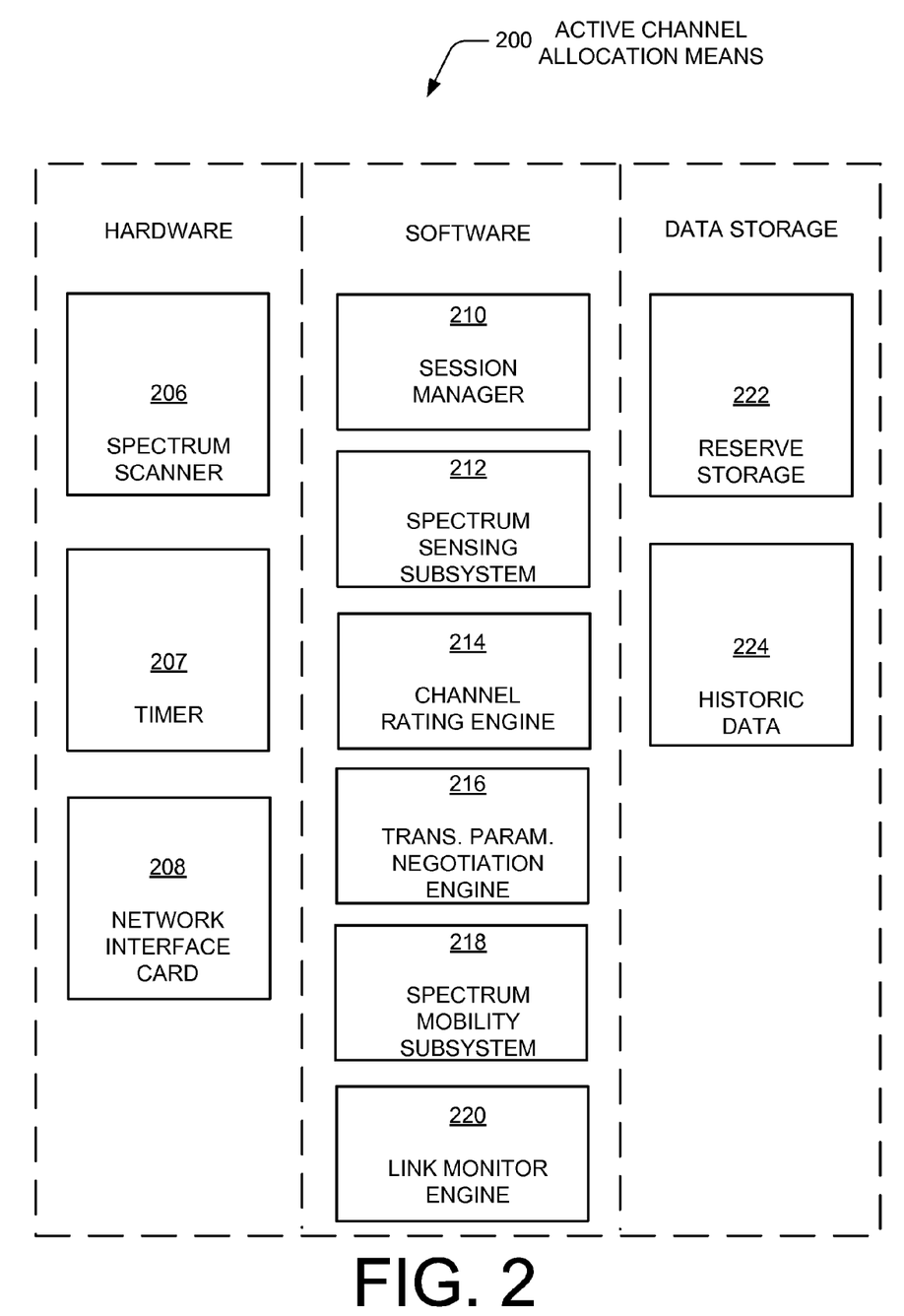
FIG. 2 schematically shows the components of a node of a network

This disclosure proposes providing each of the nodes 102-114 and the access point 116 with an active channel allocation means 200, which is shown schematically in FIG. 2. The nodes 102-114 communicate with one another directly, i.e. communication need not be via the access point 116.

As is explained in greater detail below, the active channel allocation means 200 is arranged to collect radio usage information in the assigned spectrum space (for 802.11b/g, this is 2.2 GHz-2.4 GHz). If two nodes want to exchange data (for example, video is to be streamed from the digital camera 106 to be displayed on the television 104), these two nodes will start a negotiation process through a defined signaling mechanism and, based on the transmission requirements, such as the average bandwidth, the latency, etc., and available spectrum resource at that time, will agree on a set of transmission parameters and start the transmission. In this example, the parameters comprise the transmission standard, transmission channel, transmission bit rate, and transmission power. During transmission, the wireless medium is constantly monitored by the active channel allocation means 200 and the assigned parameters can be dynamically re-negotiated when necessary.

This disclosure therefore provides a self-managing spectrum-aware network management system which efficiently utilizes available spectrum resource and effectively mitigates interference and competition between transmitting nodes. Compared to known access point-based solutions, the disclosure eliminates transmission via an access point 116 and thus provides better network throughput by saving air time and network traffic.

Compared to current practice in ad-hoc wireless networks, the system described herein is able to intelligently choose and configure the most appropriate channel, and to automatically adapt to dynamic changes of wireless medium without any manual user intervention. As will be familiar to the skilled person, the expression 'ad-hoc' in relation to wireless networks refers to an 802.11 networking framework in which devices or stations communicate directly with each other, without the use of an access point 116, and is also referred to as peer-to-peer mode.

In addition, the disclosure provides for multiple simultaneous data streams by allowing data transfer on more than one channel, to increase the overall network capacity. As is set out in greater detail below, the system described herein is not restricted to using a single wireless technology; it supports dynamic selection and switching (handover) between different wireless communications technologies, such that, for example, if both communicating nodes are equipped with multiple radios, e.g. 802.11a and 802.11b/g, or 802.11a and Bluetooth, the data stream can switch from using 802.11b/g to using 802.11a, or from 802.11a to Bluetooth, without breaking the connection.

As is shown schematically in FIG. 2, the active channel allocation means 200 comprises a hardware portion 202, a software portion 204 and a data storage potion 205.

The hardware portion 202 comprises a spectrum scanner 206, a timer 207 and a network interface card 208. The software portion 204 comprises a session manager 210, a spectrum sensing subsystem 212, a channel rating engine 214, a transmission parameter negotiation engine 216, a spectrum mobility subsystem 218 and a link monitor engine 220. The function of these components is explained in greater detail below.

As will be familiar to the skilled person, the term 'engine' as used herein refers to a software engine, i.e. a computer program that produces code which becomes the input to another computer process.

The data storage portion 205 is dedicated to storing data and comprises reservation storage potion 222 and an historic data storage portion 224.

The spectrum scanner 206 is arranged to scan the selected spectrum range in real time and to return the measured energy to the spectrum sensing subsystem 212. As will be familiar to the skilled person, energy in wireless networks is usually stated in 'dBm', which is the power ratio in decibels (dB) of the measured power referenced to one milliwatt (mW). In this embodiment, the scanner is able to deliver a radio snapshot covering a wide spectrum range, but directs its scans in the 2.2-2.4 GHz range, which focuses the scan to estimate radio activity on different 802.11b or 802.11g channels. The scanner 206 in this example scans the RF spectrum around the node 102-114 in which it is housed, which provides sufficient information to perform rating of the channels. However, in other embodiments, a wider section of the spectrum, or indeed the entire spectrum around the node could be scanned.

As will be familiar to the skilled person, known scanners vary in the spectrum range they cover, their sensing resolution, and their sensing speed. For example, depending on hardware capability, some scanners can detect only interference caused by WLAN devices, while others can detect those from WLAN devices as well as non-WLAN devices, such as cordless phones. All such scanners may be used in conjunction with the system disclosed herein but the performance of the system may be compromised by a low capability scanner.

The network interface card 208 is, as will be familiar to the skilled person, an adapter card that provides two-way communication between nodes 102-114.

The spectrum sensing subsystem 212 is responsible for collecting local spectrum resource usage information utilizing the spectrum scanner 206.

The channel rating engine 214 is arranged to rate the channels based on collected local spectrum data, and to determine if a certain part of the monitored spectrum should be used for a requested transmission. Both instant spectrum data and historical data are taken into consideration, in order to make a correct prediction of the channel usage in future. The channel rating engine 214 is arranged to evaluate the channel status (busy/free) based on the measured energy, which reflects the currently existing signal/noise strength on a channel. The rules used in rating the channels are discussed in greater details below.

The transmission parameter negotiation engine 216 is arranged to enable communicating nodes to exchange spectrum data collected locally and to control the signaling protocol in exchanging this data.

The spectrum mobility subsystem 218 is arranged to enable the transparent handover between different wireless channels and different wireless technologies, and to ensure the connections established at layer 3 and above, e.g. TCP/IP connections, are not affected by this handover.

As stated above, the channel rating engine 214 is arranged to rate the channels in order to determine which channel could be used for a particular communication. The rating algorithm considers the case for when the node will be transmitting data (a 'transmitting node') and when the node will be receiving data (a 'receiving node'), since the measured energy has a different influence on the transmitting node and the receiving node.

On the transmitting node side, the rating algorithm scores a channel based on the percentage of time in which the measured energy is under a pre-defined threshold level. The threshold value for this energy level is dependent on the scanner 206 and on the network interface card 208. It is a configurable parameter and can be set during setup of the network 100. In this example, the threshold value is −115 dbm. This is because, under the 802.11 standard, before a node can transmit data, it first needs to determine that the channel is free (a channel is 'free' if the measured energy is under the threshold value). If the channel is occupied, the transmission will be delayed for a certain backoff period, as defined by IEEE 802.11 MAC protocol. The performance—and therefore the channel rating—is largely determined by the proportion of time for which the channel is free.

On the receiving node side, different constraints apply and therefore the rating algorithm is made up of a different set of rules. In order to receive the packet correctly, the receiving node not only needs to detect packet transmission but also to decode it correctly. The strength of an existing signal or noise (which is reflected in the energy measured on the channel) is a significant factor for the receiving node to evaluate the channel status. Thus the rating algorithm carried out by the channel rating engine 214 at the receiving node ranks channels mainly by the value of measured energy level. To better predict the radio condition in future, both real time data and historical data measured in the past (stored in the historic data storage portion 224) are taken into consideration. The output of the channel rating engine 214 is two ordered lists of channels in which the channel with the best quality is given first. One list provides the order in which channels are most suitable for transmitting data, while the other list provides the order in which channels are most suitable for receiving data.

Each list provides for each channel the following information: the percent of time over which the measured energy is within a certain range (in this example, data is collected with reference to three different energy ranges). The negotiation engine 216 will use these two lists to choose the best channel, depending on the ratio of the amount of data to be received to that to be sent by the requesting application on a node.

The transmission parameter negotiation engine 216 is used to exchange spectrum data and negotiate a channel for data transmission. The transmission parameter negotiation engine 216 at the transmitting and receiving node communicate through a control channel which can be either a commonly available channel or dynamically established. In this embodiment, the common control channel is provided by existing network infrastructure, such as available wireless network at home, but in other embodiment it could be dynamically established, e.g. by using Slotted Seeded Channel Hopping (SSCH).

In the example now described, the nodes negotiate via a commonly available control channel. The transmission parameter negotiation engines 216 of the nodes 102-114 work collaboratively using a reservation system as follows. First, the transmission parameter negotiation engines 216 of two nodes negotiate transmission parameters including the chosen transmission channel, the transmission standard, the transmission bit rate, and the transmission power through the common control channel, and then broadcasts the reservation message containing channel information, requested bandwidth and time duration to all other nodes over the control channel. Every node maintains a reservation table in the reservation storage means 222 for the various channels, which is used by the transmission parameter negotiation engines 216 to determine the best channel.

The link monitor engine 220 is arranged to check whether the quality of the wireless medium (in this example, radio) in use is good enough during data transmission. The link monitor engine 220 is arranged to receive data from the network interface 208, to collect statistical link quality data therefrom and to store this data in the historic data storage portion 224. In this embodiment, this data includes a failed count, a retransmission count and a transmission data rate. However, in other embodiments, only one or any combination of these and/or other link quality indicators may be collected.

If a degradation of link quality is observed (e.g. the error rate increases more than a configurable threshold, in this example 30%), the link monitor engine 220 is arranged to notify the session manager 210 to trigger a re-negotiation process. The link monitor engine 220 is also arranged to monitor transmission behavior at upper layers. In this example, the nodes 102-114 communicate using User Datagram Protocol (UDP). As will be familiar to the skilled person, UDP is a high-level communication protocol that coordinates the transmission of data in a packet data network connection with no delivery guarantee. The link monitor engine 220 continually monitors the desired transmission speed at the transmitting node and the achieved data rate at the receiving node, and determines whether a transmission bottleneck will occur. For example, if a predetermined, configurable, threshold difference between the desired data rate and the achieved rate is seen, the link monitor engine 220 sends a signal to the session manager 210, which then launches a re-negotiation process. To avoid unnecessary switching caused by short term performance variations, the timer 207 is used to determine for how long the transmission standards are not being met. A re-negotiation process is triggered immediately or can be delayed by a configurable time period if the transmissions standards have not improved.

The spectrum mobility support subsystem 218 is arranged to implement a mobility support layer to ensure the technology or/and channel handover occurs without affecting the connections established at OSI Layer 3 and above, e.g. TCP/IP connections. When a technology or/and channel handover is conducted during transmission due to degradation of link quality, the network interface card 208 is reconfigured to operate on the new channel (for a technology transfer a different network can be configured). In some networks, this operation also causes a network disconnection followed by a network re-connection. However, such a disconnection/re-connection event will be propagated through the network stack right up to Layer 7, the application layer, and may therefore result in unexpected action of application, such as a stop or restart of data transmission. To overcome this, the spectrum mobility support layer introduces a virtual network layer that effectively hides changes in network configuration from applications. The virtual network layer implements a virtual network interface at Layer 2, which routes packets from upper layers to the physical network interface chosen by the negotiation engine 216, and vice versa. If the physical network interface is disconnected due to technology/channel switch, the virtual network interface saves the packets from upper layers in its local buffer and forwards them to the physical network interface after it is connected again. However, the disconnection/reconnection notifications caused by the technology/channel switch is not exposed to the upper layers. With the spectrum mobility support subsystem 218, the active channel allocation means 200 can support not only channel handovers within the same wireless technology, but also handovers between different wireless technologies, whilst ensuring that applications are kept unaffected by such handovers.

The session manager 210 is arranged to accept connection requests from applications and to coordinate behavior of the components of the active channel allocation means 200 to ensure the best channel is chosen, configured and monitored correctly.

Figure 3:
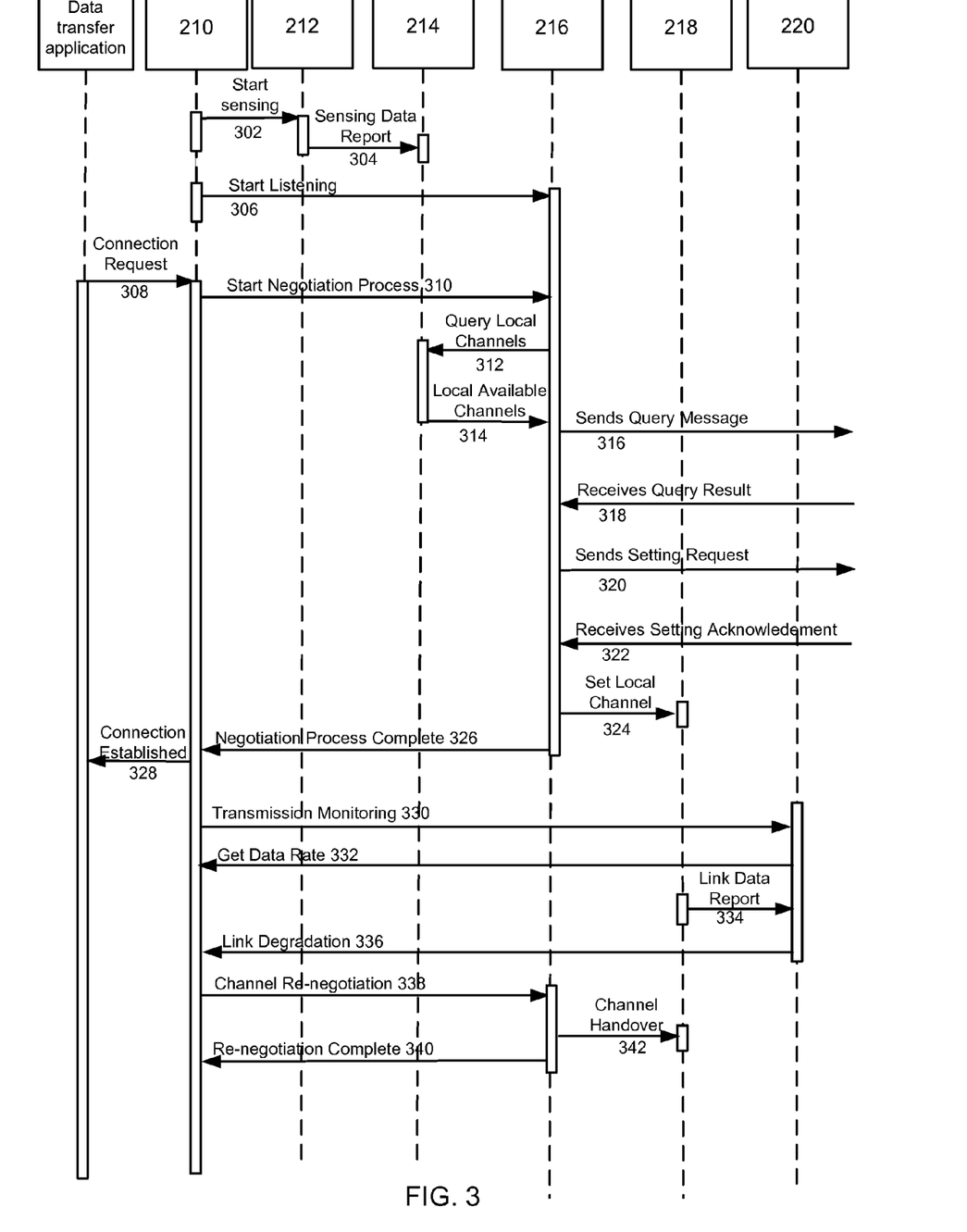
FIG. 3 schematically shows a systems process flow diagram for an initiating node.
Figure 4:
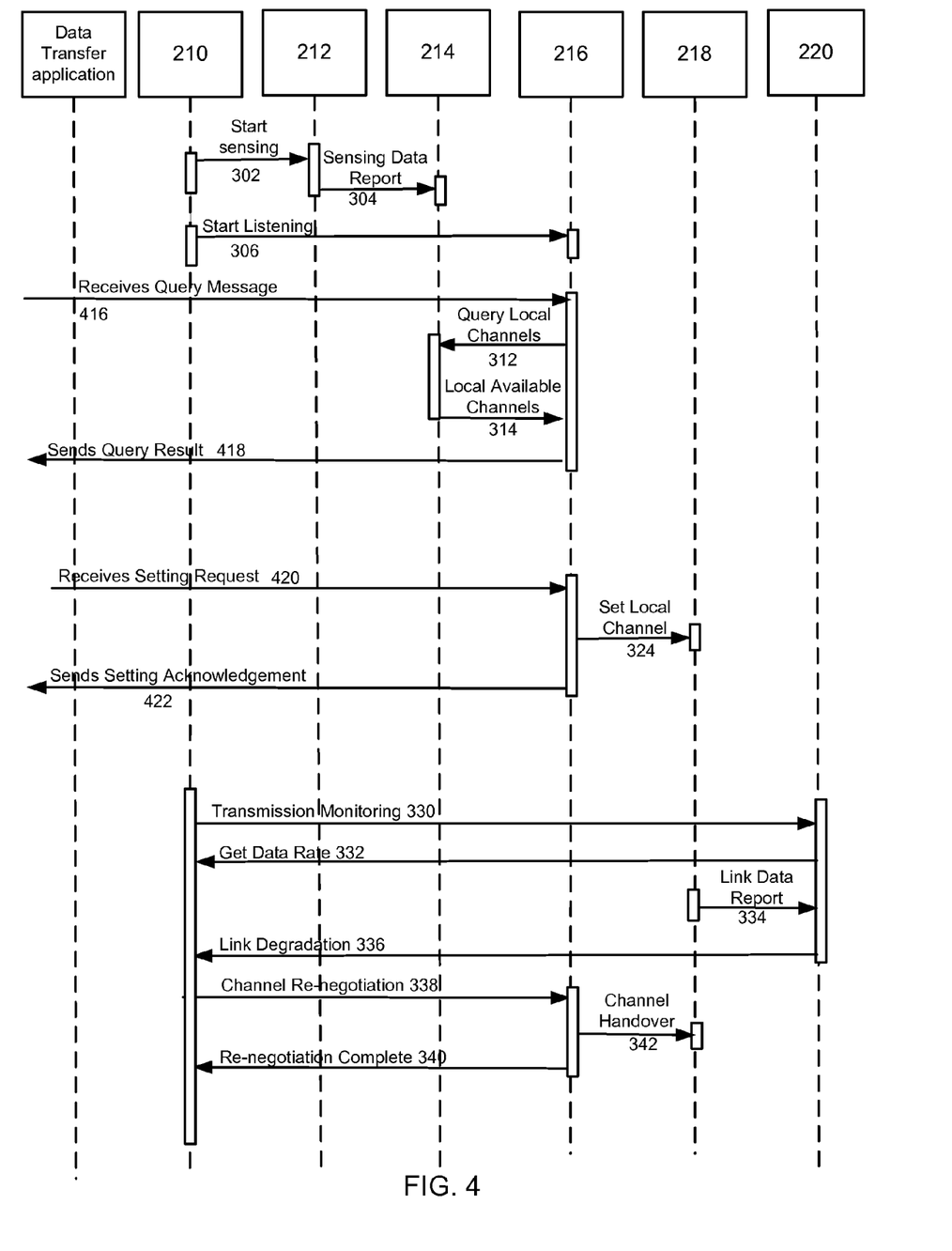
FIG. 4 schematically shows a systems process flow diagram for a responding node.

In use, the system operates as is now described with reference to the signal process flow charts of FIGS. 3 and 4. In establishing a connection between a pair of nodes, one node acts as the initiating node, i.e. the node which initiates the negotiation process and the other acts as the responding node, i.e. the node which responds to requests from the initiating node. After the negotiation process, a connection is established and the communicating nodes can send or receive data freely. In the example now described, video is to be streamed from the digital camera 106 to be displayed on the television 104. The digital camera 106 is therefore acting as the initiating node and the television 104 is acting as the responding node. FIG. 3 describes the process on the digital camera 106 which accepts requests from users/applications and initiates the signaling process, and FIG. 4 illustrates the process on the television 104 which handles requests from other remote nodes, i.e. the digital camera 106 in this example. It should be noted that in other examples each node might include both processes described in FIG. 3 and FIG. 4.

In the absence of any data transmission, the session manager 210 on each node in the network 100 (e.g. the digital camera 106 and the television 104 shown in FIG. 3 and FIG. 4 respectively) instructs (302) the spectrum sensing subsystem 212 to utilize the spectrum scanner 206 to scan the portion of the RF spectrum based on technology supported by that node. The data resulting from the scan is sent (304) to the channel rating engine 214.

This data is stored in the historic data storage portion 224. The scanning frequency, i.e. how often the RF spectrum is scanned, is a configurable parameter, depending on the bandwidth to be scanned, the capability of the scanner 206, system performance and accuracy requirement. In this example, 3 non-overlapping channels in 802.11b are scanned every 10 seconds. This provides a satisfactory result but will not cause a significant processing overhead on the nodes 102-114.

The session manager 210 also launches a process (306) to listen to negotiation requests from other nodes.

At some point, an application running on the initiating node, i.e. in this example the digital camera 106, will want to transmit data. An application running on the digital camera 106 sends (308) a connection request to the session manager 210. The session manager 210 initiates (310) a negotiation process on the negotiation engine 216, which queries (312) the channel rating engine 214 for the availability of local channels. The channel rating engine 214 returns (314) this information to the negotiation engine 216. Then the negotiation engine 216 sends (316) a message querying remote channel status via the dedicated signaling channel to the remote responding node, i.e. the television 104 in this example, with which the initiating node wants to communicate.

When the negotiation engine 216 on the television 104 receives (416, see FIG. 4) the query message, it starts to query available channels (312) and receives (314) results from its channel rating engine 214, and then sends (418, see FIG. 4) a query result message back to the digital camera 106.

On receiving (318) the result message from the television 104, the negotiation engine 216 on the digital camera 106 determines, given the available channels and their respective ratings, the best channel to use. Once this is agreed, the negotiation engine 216 communicates (320) the agreed channel to the television 104, again via the dedicated control channel.

The negotiation engine 216 on the television 104, after receiving (420) the channel setting request, informs (324) the spectrum mobility subsystem 218 of the agreed channel, and the network interface card 208 on the television 104 is then configured to operate on the agreed channel. The negotiation engine 216 on the television 104 then sends (422) an acknowledgement to the digital camera 106.

After the negotiation engine 216 on the digital camera 106 receives (322) the acknowledgement message, it requests (324) the spectrum mobility subsystem 218 to set the local channel to the agreed channel. As a result, the network interface card 208 on the digital camera 106 is configured to operate on the agreed channel and an ad-hoc connection between the initiating and responding nodes, the digital camera 106 and the television 104 in this example, is established. The negotiation engine 216 then notifies (326) the session manager 210 that the negotiation is complete, and the session manager 210 notifies (328) the application in turn.

Throughout the duration of the transmission between the nodes, the session manager 210 on both nodes monitors (330) the transmission via the link monitor 220. The session manager 210 queries (332) the link monitor 220 about link quality. Meanwhile, the link monitor 220 tracks the data rate (along with other link quality parameters) on both the transmitting and receiving node sides. A link quality degradation is recognized if a significant difference of the data rate between the transmitting and receiving nodes detected for a predetermined observation period measured by the timer 207. The threshold difference and the observation period are configurable parameters. During the same period, the spectrum mobility subsystem periodically reports (334) link quality data retrieved from the network interface card 208 to the link monitor 220.

On detection of a significant link degradation or a significant increase of error/retransmission rate on the network interface card 208 (where 'significant' means exceeding a predetermined threshold), the link monitor 220 notifies (336) the session manager 210. In response, the session manager 210 sends (338) a request for a renegotiation to the negotiation engine 216. The negotiation engine 216 again communicates with the connected node via the dedicated signaling channel and determines, given the available channels and their respective ratings, the best channel to use. Once this is agreed, the negotiation engine 216 communicates (342) the new agreed channel to the spectrum management subsystem 218 such that handover can be carried out, and then informs (340) the session manager 210 that the re-negotiation is finished. The process continues as set out above.

In other examples, other transmission parameters could be renegotiated as well as or in place to the channel. For example, the transmission technology (e.g. 802.11a, 802.11g, Bluetooth, etc.) could be renegotiated.

FIG. 2 illustrates various components of an exemplary computing-based device which may be implemented as any form of a computing and/or electronic device, e.g. any of the nodes of FIG. 1 or as the access point 116, and in which embodiments of the channel management system may be implemented.

The computing-based devices 102-116 comprise one or more inputs which are of any suitable type for receiving media content, Internet Protocol (IP) input and the like.

The computing-based device 102-116 also comprise one or more processors which may be microprocessors, controllers or any other suitable type of processors for processing computing executable instructions to control the operation of the device. Platform software comprising an operating system or any other suitable platform software may be provided at the computing-based device to enable application software to be executed on the device.

The computer executable instructions may be provided using any computer-readable media, such as memory. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The term 'node' is used to refer to any computer or computing based devices which is capable of sending and/or receiving data in a wireless network. Therefore, the access point 116 can be considered a node.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of managing a local area wireless network comprising at least two nodes capable of communicating over at least two channels, the method comprising:
   scanning at least part of a spectrum around the at least two nodes of the network;
   rating, on a processor, available channels based on spectrum usage around the at least two nodes of the network, wherein the rating comprises scoring a channel based on a percentage of time in which measured energy is less than a predefined threshold;
   storing data in memory relating to the available channels such that the data is available in establishing a direct connection between the at least two nodes of the network;
   constructing a virtual network interface within an Open System Interconnection (OSI) Data Link layer of each of the at least two nodes, configured to route the data from OSI layers above the Data Link layer to an associated network interface device;

establishing the direct connection, independent of communication via an access point, on the wireless network between the at least two nodes, the direct connection forming a data stream using a first local area wireless technology, and communicating on the wireless network between the at least two nodes using the first local area wireless technology; and monitoring the direct connection with reference to predetermined criteria, and when the predetermined criteria are not satisfied, automatically switching the data stream to a second local area wireless technology on the wireless network without breaking the direct connection and without moving the data stream to a different wireless network, and communicating on the wireless network between the at least two nodes using the second local area wireless technology, wherein the switching comprises:

configuring the network interface device of each of the at least two nodes to change from transmitting and/or receiving the data stream using the first local area wireless technology to transmitting and/or receiving the data stream using the second local area wireless technology, and routing, by the virtual network interface, data stream packets through a local buffer during the switching such that the OSI layers above the Data Link layer remain connected during the switching.

2. The method according to claim 1 further comprising sending a request to establish communication between other nodes; scanning at least part of the spectrum around the other nodes on receipt of the request; and selecting transmission parameters over which communication is to be established based on the result of the scan and the stored data.

3. The method according to claim 2 in which the scanning of at least part of the spectrum comprises scanning a spectrum on the other nodes between which communication is to be established.

4. The method according to claim 3 further comprising exchanging signaling data collected as a result of the scanning, the data comprising measured energy.

5. The method according to claim 1 wherein establishing the direct connection on the wireless network comprises establishing the direct connection on the wireless network between the at least two nodes on selected transmission parameters, monitoring the direct connection to determine that the predetermined criteria are satisfied, and when the predetermined criteria are not satisfied, determining if alternative transmission parameters are available.

6. The method according to claim 5 further comprising performing a handover on the wireless network of a technology on which the data stream is transmitted when it is determined that another technology on the wireless network is better able to carry the transmission on the wireless network.

7. A node apparatus for a local area wireless network comprising:

a spectrum scanner;

a spectrum sensing subsystem communicatively coupled to the spectrum scanner;

a channel rating engine, wherein the spectrum sensing subsystem is arranged to utilize the spectrum scanner to scan at least part of a spectrum to determine spectrum usage information, including determining spectrum usage information during an absence of data transmission on the local area wireless network, and the channel rating engine is arranged to rate channels in order of their suitability for data transmission according to the spectrum usage information, and wherein the channel rating engine is configured to rate the channels in order of their suitability according to rules based on when a node is to be a transmitting node and when the node is to be a receiving node;

a network interface card, the network interface card being configurable to switch from transmitting and/or receiving data between multiple local area wireless technologies independent of communication via an access point; and a spectrum mobility subsystem arranged to reconfigure the local area wireless network to utilize a different local area wireless technology on which transmission of the data occurs on the local area wireless network when a link quality of the local area wireless network has fallen below a predetermined standard, the spectrum mobility subsystem arranged to construct a virtual network layer within transmission protocol layers, the virtual network layer configured to route the data through a local buffer during switching of the network interface card such that upper transmission protocol layers remain connected during the switching.

8. The node according to claim 7 further comprising a negotiation engine arranged to communicate the spectrum usage information with another node with which connection is requested, such that the channel rating engine can utilize the spectrum usage information collected at both nodes in rating channels.

9. The node according to claim 7 further comprising a link monitor arranged to monitor link quality and to determine if the link quality meets predetermined standards.

10. The node according to claim 7 wherein the spectrum mobility subsystem is configured to allow applications running on the node to be unaffected by a change in a network configuration, including a change in a local area wireless technology used.

11. The node according to claim 7 in which the spectrum scanner is arranged to scan a portion of the spectrum which is local to the node.

12. A method of improving spectrum usage in a local area wireless network performed by one or more processors executing computer-readable instructions, the method comprising:

rating available technologies and channels to provide a projected transmission quality, the rating including rating a quality of an available channel based on a strength of existing signals and/or noise energy on that channel;

establishing a peer-to-peer link on the local area wireless network between at least two nodes, the peer-to-peer link forming a data stream using a first local area wireless technology;

constructing a virtual network interface within an Open System Interconnection (OSI) Data Link layer of each of the at least two nodes, configured to route data from OSI layers above the Data Link layer to an associated network interface device;

monitoring the peer-to-peer link to determine if a peer-to-peer link quality meets predetermined standards;

performing a handover of transmission parameters with which transmission of data occurs on the local area wireless network when it is determined that the peer-to-peer link quality falls below the predetermined standards, wherein performing the handover comprises automatically switching the data stream to a second local area wireless technology on the local area wireless network without breaking the peer-to-peer link, wherein the handover comprises:
- configuring the network interface device of each of the at least two nodes to change from transmitting and/or receiving the data using the first local area wireless technology to transmitting and/or receiving the data using the second local area wireless technology, and
- routing, by the virtual network interface, the data through a local buffer during the handover such that the OSI layers above the Data Link layer remain connected during the handover, and
- wherein the first local area wireless technology is a different local area wireless technology than the second local area wireless technology.

13. The method according to claim 12 further comprising switching to a channel and/or local wireless technology with a highest projected transmission quality.

14. The method according to claim 13 further comprising rating the projected transmission quality of each channel and/or local wireless technology for transmitting nodes based on a proportion of time for which the energy on that channel and/or local wireless technology is below a threshold level.

15. The method according to claim 13 further comprising rating the projected transmission quality of each channel and/or local wireless technology based on both a historical and an instant energy level on that channel and/or local wireless technology.

16. The method according to claim 12 further comprising implementing a mobility support layer in a transmission protocol, wherein the handover is performed from the first local wireless technology on the local area wireless network to the second local wireless technology on the local area wireless network and applications running on at least one of the at least two nodes are unaffected by the handover.

* * * * *